(12) United States Patent
Flehmig

(10) Patent No.: US 8,781,722 B2
(45) Date of Patent: Jul. 15, 2014

(54) ANTICIPATORY CONTROL OF THE TRANSVERSE VEHICLE DYNAMICS IN EVASIVE MANEUVERS

(75) Inventor: Folko Flehmig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/512,983

(22) PCT Filed: Nov. 12, 2010

(86) PCT No.: PCT/EP2010/067399
§ 371 (c)(1),
(2), (4) Date: Aug. 14, 2012

(87) PCT Pub. No.: WO2011/067092
PCT Pub. Date: Jun. 9, 2011

(65) Prior Publication Data
US 2012/0323477 A1    Dec. 20, 2012

(30) Foreign Application Priority Data
Dec. 1, 2009 (DE) .......................... 10 2009 047 360

(51) Int. Cl.
*G06F 17/10* (2006.01)
(52) U.S. Cl.
USPC .......................................... 701/301
(58) Field of Classification Search
USPC .......................................... 701/301
See application file for complete search history.

(56) References Cited

U.S. PATENT DOCUMENTS

| 5,477,461 | A * | 12/1995 | Waffler et al. | 701/301 |
|---|---|---|---|---|
| 6,289,281 | B1 * | 9/2001 | Shinmura et al. | 701/301 |
| 6,748,302 | B2 * | 6/2004 | Kawazoe | 701/1 |
| 8,244,408 | B2 * | 8/2012 | Lee et al. | 700/301 |
| 2002/0095246 | A1 * | 7/2002 | Kawazoe | 701/1 |
| 2004/0193374 | A1 * | 9/2004 | Hac et al. | 701/301 |
| 2008/0065328 | A1 * | 3/2008 | Eidehall et al. | 701/301 |
| 2010/0082195 | A1 * | 4/2010 | Lee et al. | 701/25 |
| 2010/0121576 | A1 * | 5/2010 | Aso et al. | 701/301 |
| 2010/0131142 | A1 * | 5/2010 | Deng et al. | 701/29 |

FOREIGN PATENT DOCUMENTS

| DE | 198 27 117 | 12/1999 |
|---|---|---|
| DE | 198 31 249 | 3/2000 |
| DE | 10 2007 044988 | 4/2009 |
| EP | 1 403 157 | 3/2004 |
| EP | 1 992 538 | 11/2008 |

* cited by examiner

*Primary Examiner* — Mary Cheung
*Assistant Examiner* — Anne Mazzara
(74) *Attorney, Agent, or Firm* — Kenyon & Kenyon LLP

(57) ABSTRACT

A method for influencing the lateral dynamics of a vehicle in an evasive maneuver with the aid of a vehicle controller which controls the sideslip angle and/or the yaw rate of the vehicle, and which triggers an automatic control action when a predefined threshold value is exceeded. The driving situation is monitored with regard to an obstacle, and different interventions are carried out depending on the classification of the situation. This optimizes the interventions with regard to stability and comfort, so that an optimal behavior of the vehicle is achieved in all driving situations.

14 Claims, 1 Drawing Sheet

FIG. 1a
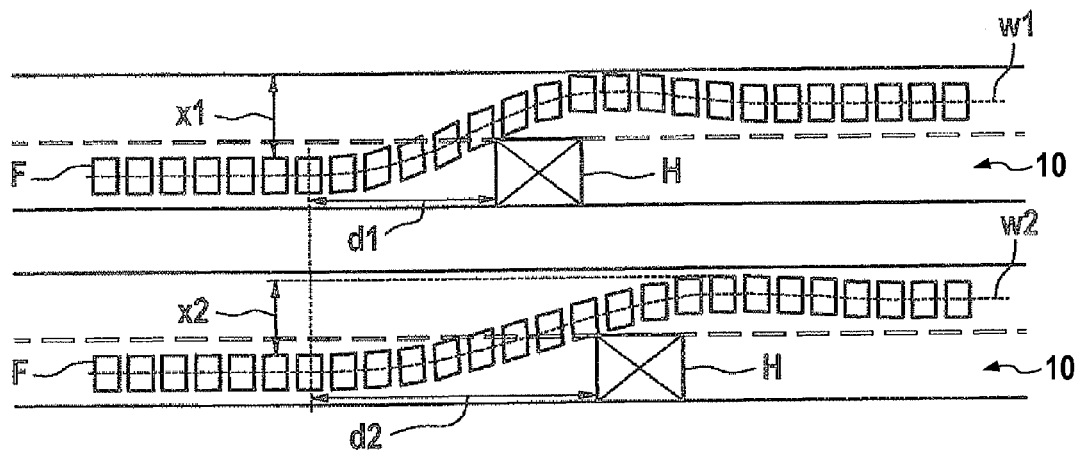
FIG. 1b
FIG. 2
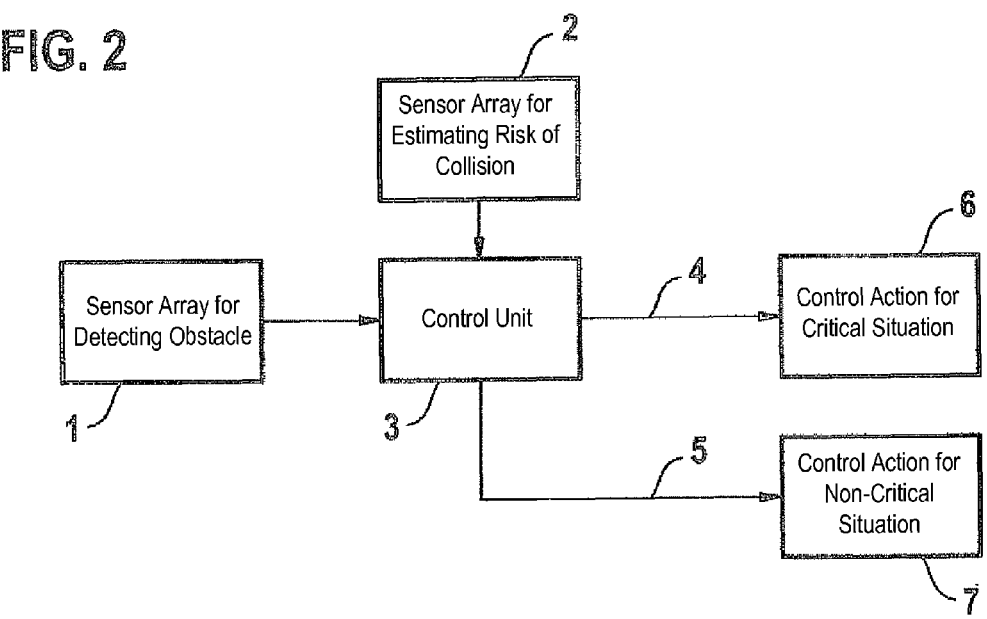

ANTICIPATORY CONTROL OF THE TRANSVERSE VEHICLE DYNAMICS IN EVASIVE MANEUVERS

FIELD OF THE INVENTION

The present invention relates to a method for influencing the transverse vehicle dynamics of a vehicle.

BACKGROUND INFORMATION

It is believed that there are electronic stability programs which ensure that evasive maneuvers or lane-change maneuvers of a motor vehicle can be implemented in a stable and safe manner. In critical situations in which the vehicle oversteers or understeers, for instance, individual wheels are braked, the engine torque is reduced or other component are actuated, such as an active front axle steering system or an active wheel suspension, for instance, in an effort to stabilize the vehicle.

Such electronic stability programs usually regulate the yaw rate and/or the sideslip angle of a vehicle and intervene in the vehicle operation in the event that the controlled variable exceeds a specific threshold value. The threshold values are frequently selected such that a suitable compromise is achieved between high driving safety (by timely control interventions) and high comfort (by avoiding inappropriate or premature control interventions) for all potential driving situations. Known electronic stability programs thus intervene relatively early in some driving situations, and relatively late in other driving situations. However, this may pose a problem in some driving situations, for instance when the vehicle must evade an obstacle and the driver initiates steering only late. In such a case, an early control intervention causes the driver-desired evasive steering movement to be inhibited, so that the vehicle is unable to accelerate with sufficient speed in the transverse direction to avoid the obstacle. On the other hand, if the driver steers strongly and very early, the vehicle may begin to fishtail at the end of the evasive maneuver.

SUMMARY OF THE INVENTION

Therefore, it is an objective of the exemplary embodiments and/or exemplary methods of the present invention to optimize the interventions of an electronic stability system in situations in which a vehicle evades an obstacle.

According to the exemplary embodiments and/or exemplary methods of the present invention, this object is attained by the features described herein. Further developments of the present invention are the subject matter of the further descriptions herein.

According to the exemplary embodiments and/or exemplary methods of the present invention, the vehicle environment is monitored for the presence of an obstacle, the risk of a collision with the obstacle is estimated by assessing at least one measured quantity, and the control behavior of the electronic stability program is set as a function of the dangerous situation. As a result, depending on the dangerous situation, the electronic stability program may allow smaller or greater sideslip angles or yaw rates, and thus a faster or slower movement of the vehicle transversely to the roadway. In more critical situations, in which the vehicle is rapidly approaching an obstacle, for example, greater threshold values may be set for the sideslip angle or the yaw rate than in a standard mode of the controller, in order to allow a greater acceleration of the vehicle transversely to the roadway. In less critical situations, on the other hand, in which the vehicle approaches an obstacle farther away at a lower speed, the electronic stability program may be set in such a way that it intervenes earlier than in standard mode in order to ensure high stability of the vehicle and thus greater driving safety in this way. In this case, a slower sideward movement of the vehicle suffices to evade the obstacle.

The control behavior of the vehicle controller may be adapted only in an evasive maneuver. In a normal lane change or during cornering, on the other hand, the controller is to be operated in standard mode. Evasive maneuvers are detectable with the aid of surround sensors and possibly additional sensors such as a steering angle sensor. In this case, the surround sensors, such as optical or radar sensors, detect an obstacle, the distance to the obstacle and the speed at which it approaches; with the aid of the signal from the steering angle sensor, it is possible to determine the speed or acceleration at which the steering wheel is actuated. Very high steering speeds or accelerations in connection with a close obstacle and/or a high speed of approach are an indication of an evasive maneuver.

According to one specific embodiment of the present invention, one or more of the following quantities are measured to estimate the dangerous situation and taken into account in setting the control behavior: the distance to the obstacle, the speed of the own vehicle, the speed of the obstacle, the relative speed of vehicle and obstacle, and/or the time period until a collision is to be expected. Distance and speeds are easily measurable with the aid of a known sensor system, and the time period until a potential collision occurs may be derived therefrom.

In a critical situation, the controller may be set in such a way that sideslip angles and/or yaw rates are possible that are greater than in a standard mode. This also allows the vehicle to move faster in a transverse direction to the roadway and to better evade the obstacle. In a less critical situation, on the other hand, a threshold value that is smaller than in a standard mode may be set. This stabilizes the vehicle earlier.

The intensity of a control action may also be varied as a function of the dangerous situation. In rather critical situations, a brake intervention which opposes the yawing behavior of the vehicle may be weaker than in a standard mode, or it may be omitted entirely. In critical situations, this does not inhibit the yaw movement of the vehicle or it inhibits it to a lesser degree, and the vehicle is able to move sidewards more rapidly and evade the obstacle. In less critical driving situations, on the other hand, the control action may be stronger than in a standard mode. This stabilizes the vehicle more rapidly.

According to one embodiment of the invention, an initial evasive steering movement of the driver is aided in critical driving situations. In critical situations, the controller is able to actuate the wheel brakes in such a way, for instance, that the brake intervention generates a yaw moment about the vertical axis of the vehicle, which assists in the steering motion of the driver. In the same way the brake force at an outside wheel may be reduced, or at least one outside wheel be accelerated in order to assist in the evasive steering motion of the driver. As an alternative, the steering actuator could automatically intervene in the steering. In less critical situations, the control interventions for steering assistance may be omitted, or a steering torque that counteracts an excessive steering motion of the driver may be applied at the steering wheel.

The control behavior may basically be adapted to the particular dangerous situation by varying a control parameter, a threshold value, or a setpoint variable of a controller.

In the following, the exemplary embodiments and/or exemplary methods of the present invention are explained in greater detail by way of example, with reference to the attached drawing.

BRIEF DESCRIPTION OF THE DRAWINGS

FIG. 1a shows the typical curve of an evasive maneuver at a small distance to an obstacle and high relative speed.

FIG. 1b shows the typical curve of an evasive maneuver at a large distance to an obstacle H and low relative speed.

FIG. 2 shows a block diagram of an electronic stability program.

DETAILED DESCRIPTION

FIGS. 1a and 1b show two typical scenarios of an evasive maneuver, in which a vehicle F is approaching an obstacle H and evades it. The movement trajectory of vehicle F is denoted by w1 or w2. To simplify matters, it is assumed that obstacle H is stationary.

In both scenarios, the driver initially steers vehicle F to the left (evasive steering motion) and then, approximately at the level of obstacle H, steers the vehicle in the opposite direction (counter-steering motion) in order not to leave roadway 10. Following the countersteering, vehicle F begins to fishtail, but stabilizes again and then continues to drive straight again in the end.

Since distance d1 between vehicle F and obstacle H is relatively small in the scenario of FIG. 1a, the vehicle must accelerate heavily in the transverse direction in order to be able to evade obstacle H. However, this is only possible if vehicle F is steered at a high yaw rate, and if the electronic stability program does not inhibit the yawing motion of the vehicle. The control behavior of the electronic stability program in the evasive steering phase thus is set in such a way that the yawing motion of vehicle F is inhibited only slightly or not at all. Furthermore, it is provided that the evasive steering motion of the driver is actively assisted, e.g., by applying an additional steering moment, or by implementing an automatic brake intervention that aids the yawing motion of vehicle F. During the maneuver, vehicle F moves toward the side by a distance x1. During the countersteering phase as well, the controller is set such that greater yaw or fishtail angles are permitted than in a standard mode. While it is true that the rear of vehicle F may swerve out more, this disadvantage is to be preferred to a collision with obstacle H.

In FIG. 1b, distance d2 between vehicle F and obstacle H at the beginning of the evasive maneuver is considerably greater than in FIG. 1a. The driver has more time to evade obstacle H laterally. The acceleration of vehicle F in the transverse direction may therefore be lower. The control behavior of the electronic stability program thus is set for greater stability. As a consequence, the controller already intervenes in the driving operation during the evasive steering motion, e.g., by brake interventions, and counteracts a yawing motion of vehicle F. If necessary, a steering moment which counteracts the steering motion of the driver is applied at the steering wheel. As a result, vehicle F moves in a more stable manner than in the scenario of FIG. 1a. In the countersteering phase, vehicle F is likewise stabilized earlier and more heavily by a corresponding setting of the controller. Overall, vehicle F moves a distance x2 toward the side. This distance is sufficient to evade obstacle H.

FIG. 2 shows a simplified block diagram of a corresponding electronic stability program. The actual controller is stored in a control unit 3, as software.

The system includes a sensor array 1 for detecting an evasive maneuver. It has one or more sensor(s) for detecting an obstacle H, e.g., an optical sensor or a radar sensor. In addition, a steering angle sensor or another sensor is provided by which a steering motion is measurable. An algorithm included in the control unit analyzes the sensor signals and assesses whether or not an evasive maneuver is at hand.

Furthermore, the system includes a sensor array 2, by which one quantity or several quantities are measured, such as the speed of own vehicle F and obstacle H, a relative speed, and/or the time period required by vehicle F to reach obstacle H. The signals from sensor array 2 may be used to estimate the risk of a collision in qualitative terms. The control behavior of the controller is then set as a function of the dangerous situation.

The current danger situation may be subdivided into different classes, for instance, and the control behavior of the controller be set in stepwise manner. In the exemplary embodiment illustrated, two danger stages (critical and less critical) are differentiated, and a corresponding control strategy 4 or 5 is selected. Control strategy 4 relates to a critical situation in which vehicle F approaches an obstacle H at high relative speed, the obstacle being located a short distance d1 in front of vehicle F (according to FIG. 1a); control strategy 5 relates to a less critical situation, in which vehicle F approaches obstacle H at a low relative speed, vehicle H being located at a greater distance d2 in front of vehicle F (according to FIG. 1b). Selected control strategy 4 or 5 is then implemented by corresponding control actions 6 or 7, as described earlier.

Optionally, it is of course also possible to differentiate between more than two danger stages and consequently to set more than two control strategies.

What is claimed is:

1. A method for influencing transverse dynamics of a vehicle in an evasive maneuver, the method comprising:
controlling, with a vehicle controller, at least one of a sideslip angle and a yaw rate of the vehicle;
determining, by the vehicle controller, whether to automatically intervene in a driver control depending on whether a predefined threshold value is exceeded by the at least one of the sideslip angle and the yaw rate, wherein the automatic intervention is triggered when the predefined threshold value is exceeded by the at least one of the sideslip angle and the yaw rate;
monitoring a vehicle environment with regard to an obstacle possibly present in a driving direction of the vehicle;
estimating a risk of a collision with the obstacle; and
setting a particular control behavior of the vehicle controller as a function of a dangerous situation;
wherein the predefined threshold value is selected based on a speed at which the vehicle is approaching the obstacle.

2. The method of claim 1, wherein, to assess the dangerous situation, at least one of: a distance to the obstacle, a speed of the vehicle, a speed of the obstacle, a relative speed between the obstacle and the vehicle, and a time period the vehicle requires to reach the obstacle are determined, and the control behavior of the controller is set on the basis of one or more of these quantities.

3. The method of claim 1, wherein an intensity of a control action that counteracts a yawing motion of the vehicle is weaker in a critical driving situation than in a standard mode, or no such control action is performed.

4. The method of claim 1, wherein an intensity of a control action that counteracts a yawing motion of the vehicle is stronger in a less critical driving situation than in a standard mode.

5. The method of claim 1, wherein the controller assists in an evasive steering motion of the driver in a critical driving situation.

6. The method of claim 1, wherein in a critical driving situation, at least one of other parameters and other threshold values are set at the controller than in a standard mode.

7. The method of claim 1, wherein a controller setpoint quantity is determined as a function of the dangerous situation.

8. The method of claim 7, wherein the controller setpoint quantity is one of a setpoint pressure, a setpoint pressure gradient, a steering angle, and a steering angle gradient.

9. The method of claim 1, wherein an evasive maneuver is detected with the aid of a sensor array, and the control behavior of the controller is adapted as a function of the dangerous situation only for a positive detection of an evasive maneuver.

10. A method for influencing transverse dynamics of a vehicle in an evasive maneuver, the method comprising:
controlling, with a vehicle controller, which controls at least one of a sideslip angle and a yaw rate of the vehicle, and which triggers an automatic control action when a predefined threshold value is exceeded by the at least one of the sideslip angle and the yaw rate;
monitoring a vehicle environment with regard to an obstacle possibly present in a driving direction of the vehicle;
estimating a risk of a collision with the obstacle; and
setting a particular control behavior of the vehicle controller as a function of a dangerous situation
wherein a threshold value, an amplification factor or another parameter of the controller is set in such a way that in a critical driving situation, the controller allows at least one of greater sideslip angles and greater yaw rates than in a standard mode.

11. The method of claim 10, wherein, in the standard mode, no obstacle is present in the driving direction of the vehicle.

12. A method for influencing transverse dynamics of a vehicle in an evasive maneuver, the method comprising:
controlling, with a vehicle controller, which controls at least one of a sideslip angle and a yaw rate of the vehicle, and which triggers an automatic control action when a predefined threshold value is exceeded by the at least one of the sideslip angle and the yaw rate;
monitoring a vehicle environment with regard to an obstacle possibly present in a driving direction of the vehicle;
estimating a risk of a collision with the obstacle; and
setting a particular control behavior of the vehicle controller as a function of a dangerous situation
wherein a threshold value, an amplification factor or another parameters of the controller is set in such a way that in a less critical driving situation, the controller intervenes earlier than in a standard mode.

13. The method of claim 12, wherein, in the standard mode, no obstacle is present in the driving direction of the vehicle.

14. A control unit for influencing transverse dynamics of a vehicle in an evasive maneuver, comprising:
a vehicle controller configured to:
control at least one of a sideslip angle and a yaw rate of the vehicle; and
determine whether to automatically intervene in a driver control depending on whether a predefined threshold value is exceeded by the at least one of the sideslip angle and the yaw rate, wherein the automatic intervention is triggered when the predefined threshold value is exceeded by the at least one of the sideslip angle and the yaw rate;
a monitoring arrangement to monitor a vehicle environment with regard to an obstacle possibly present in a driving direction of the vehicle;
an estimating arrangement to estimate a risk of a collision with the obstacle; and
a setting arrangement to set a particular control behavior of the vehicle controller as a function of a dangerous situation;
wherein the predefined threshold value is selected based on a speed at which the vehicle is approaching the obstacle.

* * * * *